(12) United States Patent
Baus et al.

(10) Patent No.: US 12,174,062 B2
(45) Date of Patent: Dec. 24, 2024

(54) SENSOR ELEMENT SUSPENSION

(71) Applicant: Baker Hughes Holdings LLC, Houston, TX (US)

(72) Inventors: Edward Joseph Baus, Akron, OH (US); Andrew Edward Knauss, Mentor, OH (US); Scott Anderson, Clinton, OH (US); Nils Neumann, Spring, TX (US); Conrad Kao, Spring, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/472,801

(22) Filed: Sep. 13, 2021

(65) Prior Publication Data
US 2023/0083592 A1 Mar. 16, 2023

(51) Int. Cl.
| | | |
|---|---|---|
| *G01J 1/04* | (2006.01) | |
| *B33Y 80/00* | (2015.01) | |
| *G01J 1/02* | (2006.01) | |
| *G01J 1/44* | (2006.01) | |
| *G01T 1/00* | (2006.01) | |

(52) U.S. Cl.
CPC ............ *G01J 1/0403* (2013.01); *B33Y 80/00* (2014.12); *G01J 1/0271* (2013.01); *G01J 1/44* (2013.01); *G01T 1/00* (2013.01); *G01J 2001/4453* (2013.01)

(58) Field of Classification Search
CPC .......... G01J 1/0403; G01J 1/0271; G01J 1/44; G01J 2001/4453; B33Y 80/00; G01T 1/00
See application file for complete search history.

(56) References Cited

U.S. PATENT DOCUMENTS

| 6,386,912 B1* | 5/2002 | Li ................. H01R 9/0527 |
| | | 439/578 |
| 8,217,356 B2 | 7/2012 | Fruehauf et al. |
| 8,262,592 B1* | 9/2012 | Brooks ............... A45D 34/041 |
| | | 601/17 |
| 9,997,557 B2 | 6/2018 | Liu |
| 2006/0271084 A1* | 11/2006 | Schraga ............. A61B 5/14532 |
| | | 600/573 |
| 2010/0032577 A1* | 2/2010 | Fruehauf ................ G01T 1/202 |
| | | 250/368 |
| 2011/0121187 A1* | 5/2011 | Frank ....................... G01T 1/20 |
| | | 250/368 |
| 2013/0075617 A1* | 3/2013 | Simonetti ............. C09K 11/772 |
| | | 252/301.36 |

(Continued)

*Primary Examiner* — Thanh Luu

(74) *Attorney, Agent, or Firm* — Mintz, Levin, Cohn, Ferris, Glovsky and Popeo, P.C.

(57) ABSTRACT

An apparatus for suspending a sensor element is provided. The apparatus can include a housing including a cavity, an inner surface, and a first end cap integrally formed within a first end of the housing. The housing can include a sensor element therein. The first end cap can include a first plurality of suspension elements integrally formed within the first end cap and arranged to project from a surface of the first end cap toward the cavity. The inner surface of the housing and/or the first plurality of suspension elements can suspend the sensor element within the cavity as the sensor element translates within the cavity. Related systems and methods of manufacture are also described.

13 Claims, 12 Drawing Sheets

(56) References Cited

U.S. PATENT DOCUMENTS

| | | | |
|---|---|---|---|
| 2015/0187622 A1* | 7/2015 | Johnson | H01L 21/68 |
| | | | 438/464 |
| 2017/0221593 A1* | 8/2017 | Alvarez | B33Y 80/00 |
| 2018/0094685 A1* | 4/2018 | Marya | F16F 1/02 |
| 2020/0000296 A1* | 1/2020 | Moon | A47K 10/18 |
| 2021/0107165 A1* | 4/2021 | Yerazunis | G01L 1/04 |
| 2021/0116947 A1* | 4/2021 | Czechowski | G05D 16/10 |
| 2021/0172974 A1* | 6/2021 | Dwyer | B23K 26/21 |
| 2021/0246890 A1* | 8/2021 | Yu | F04B 17/03 |

\* cited by examiner

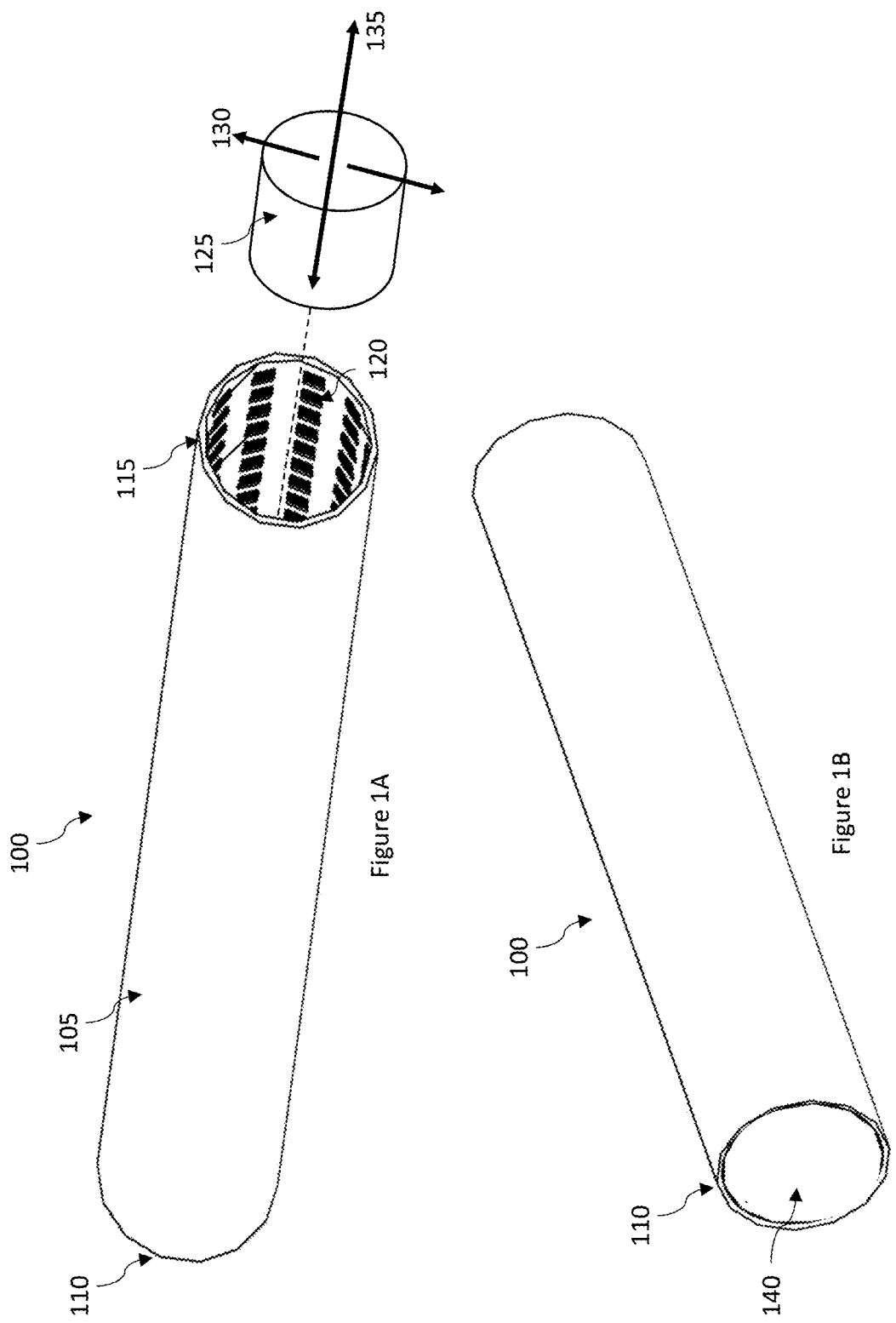

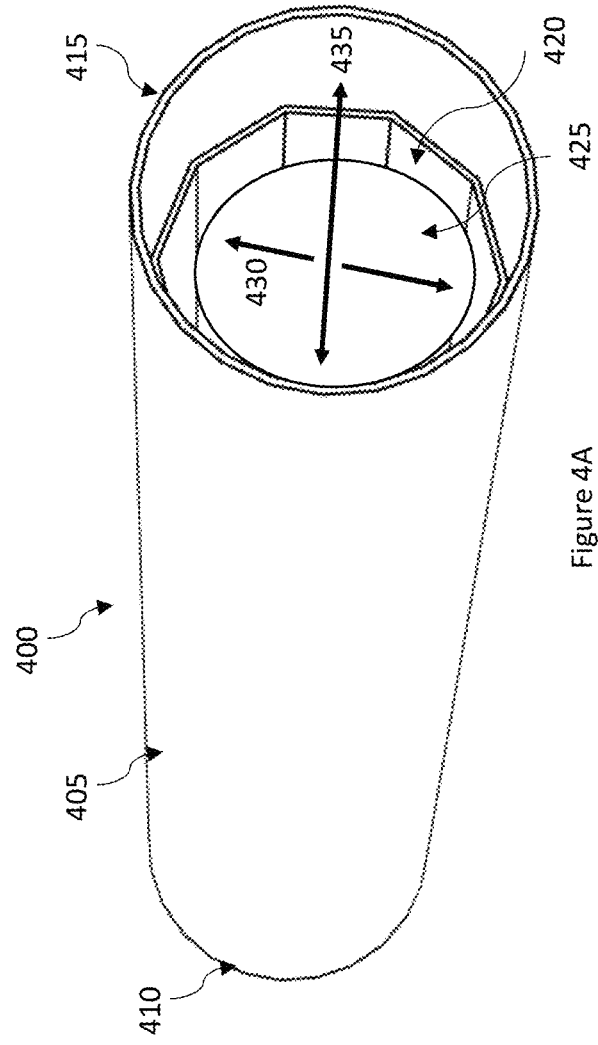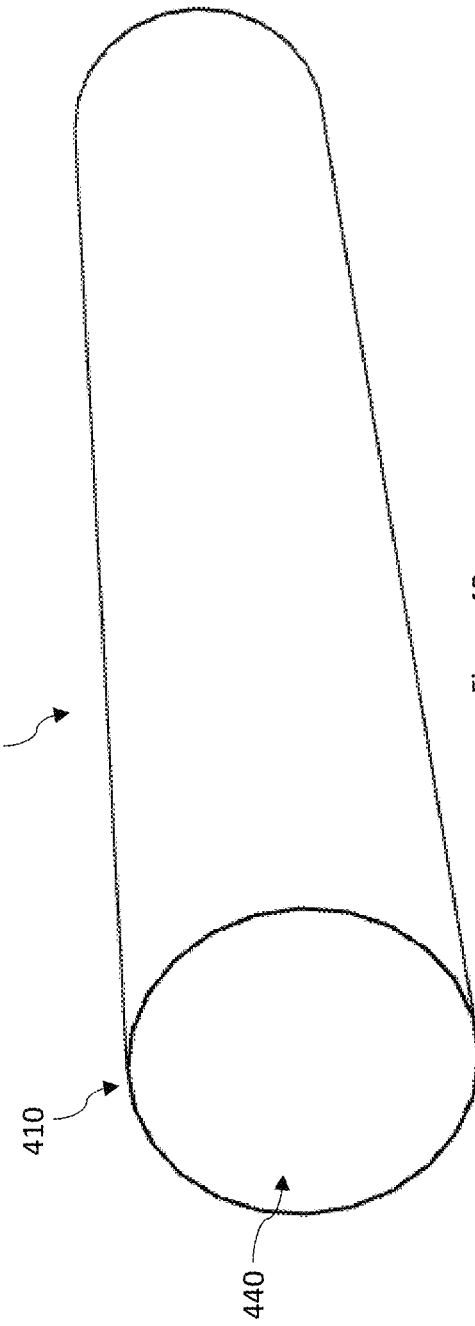

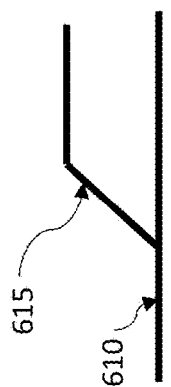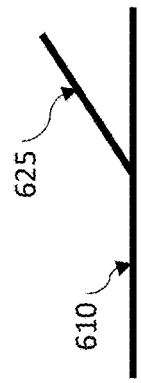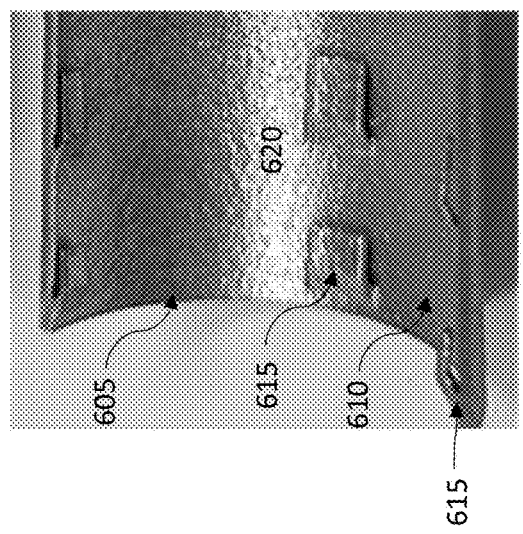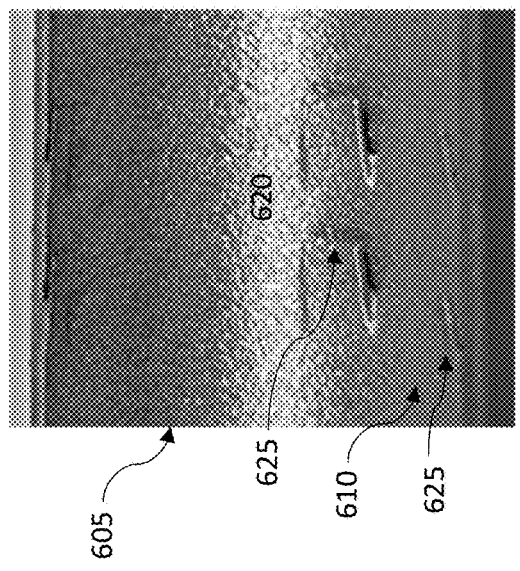

SENSOR ELEMENT SUSPENSION

BACKGROUND

Sensors can include sensor elements configured within a housing. Portions of the sensor can include structural elements configured to suspend the sensor element within a housing of the sensor to ensure the sensor operates within specified manufacturing tolerances and to reduce the risk of damage during transport or use of the sensor.

SUMMARY

In one aspect, an apparatus is provided. In one embodiment, the apparatus can include a housing including a cavity, an inner surface, and a first end cap integrally formed within a first end of the housing. The housing can include a sensor element therein. The first end cap can include a first plurality of suspension elements integrally formed within the first end cap and arranged to project from a surface of the first end cap toward the cavity. The inner surface of the housing and/or the first plurality of suspension elements can suspend the sensor element within the cavity as the sensor element translates within the cavity.

In some embodiments, the housing can include a second plurality of suspension elements integrally formed on the inner surface of the housing, the second plurality of suspension elements arranged to radially project from the inner surface of the housing toward the cavity. In some embodiments, the at least one suspension element of the second plurality of suspension elements can include a radial suspension element coupled to the inner surface of the housing at a first end of the radial suspension element and/or at a second end of the radial suspension element. In some embodiments, the second plurality of suspension elements can be configured with a first spring constant to reduce radial translation of the sensor element within the housing.

In some embodiments, the at least one suspension element of the first plurality of suspension elements can include an axial suspension element coupled to the surface of the first end cap at a first end of the axial suspension element. In some embodiments, the axial suspension element can be further coupled to the surface of the first end cap at a second end of the axial suspension element.

In some embodiments, the first plurality of suspension elements can be configured with a second spring constant to reduce axial translation of the sensor element within the housing. In some embodiments, the sensor element can be formed from cerium bromide, lanthanum halide, or sodium iodide. In some embodiments, the apparatus can be a gamma sensor. In some embodiments, the apparatus can be formed from a metal material including titanium, aluminum, stainless steel, or a combination thereof. In some embodiments, the second end cap comprises a sapphire window.

In another aspect, a method is provided. In one embodiment, the method can include providing a metal material. The method can also include forming an apparatus by an additive manufacturing process using the metal material. Forming the apparatus can include forming a housing of the apparatus. The housing can include a cavity configured to suspend a sensor element therein. The housing can also include an inner surface, and a first end cap integrally formed within a first end of the housing. The first end cap can include a first plurality of suspension elements integrally formed within the first end cap and arranged to project from a surface of the first end cap toward the cavity.

In one embodiment, the method can include forming a second plurality of suspension element integrally on the inner surface of the housing. The second plurality of suspension elements can project radially from the inner surface of the housing toward the cavity. In one embodiment, the metal material or the additive manufacturing process can be selected to form the second plurality of suspension elements with a predetermined amount of radial stiffness, a predetermined amount of radial vibration dampening, or a predetermined amount of temperature induced radial displacement. In one embodiment, the metal material or the additive manufacturing process can be selected to form the first plurality of suspension elements with a predetermined amount of axial stiffness, a predetermined amount of axial vibration dampening, or a predetermined amount of temperature induced axial displacement.

In one embodiment, the method can also include forming a second end cap of the apparatus by the additive manufacturing process using the metal material, and inserting a sapphire window into a portion of the second end cap. In one embodiment, the method can further include inserting a sensor element within the housing and welding the second end cap within a second end of the housing.

In one embodiment, the metal material comprises titanium, aluminum, stainless steel, or a combination thereof.

In another aspect, a system is provided. In one embodiment, the system can include a sensor. The sensor can include a housing including a cavity, an inner surface, and a first end cap integrally formed within a first end of the housing. The housing can be configured to receive a sensor element therein. The first end cap can include a first plurality of suspension elements integrally formed within the first end cap and arranged to project from a surface of the first end cap toward the cavity. The inner surface of the housing and/or the second plurality of suspension elements can be configured to suspend the sensor element within the cavity as the sensor element translates within the cavity. The sensor can also include a second end cap affixed to a second end of the housing and a sensor element within the housing. The system can also include a photomultiplier tube coupled to the sensor. The system can further include a computing device communicatively coupled to the photomultiplier tube. The computing device can include at least one data processor configured to receive data generated by the photomultiplier tube.

In one embodiment, the sensor element can be formed from cerium bromide, lanthanum halide, or sodium iodide and the sensor can be a gamma sensor.

DESCRIPTION OF DRAWINGS

These and other features will be more readily understood from the following detailed description taken in conjunction with the accompanying drawings, in which:

FIGS. 1A-1B illustrate isometric views of an example embodiment of a sensor including a sensor suspension according to some implementations of the current subject matter;

FIGS. 4A-4B illustrate isometric views of another example embodiment of a sensor including a sensor suspension according to some implementations of the current subject matter;

FIGS. 6A-6B illustrate cross-sectional views of an example embodiment of a plurality of suspension elements included in the sensor described herein according to some implementations of the current subject matter;

FIGS. 6C-6D illustrate cross-sectional views of another example embodiment of a plurality of suspension elements included in a housing of the sensor described herein according to some implementations of the current subject matter;

Figure 2A:
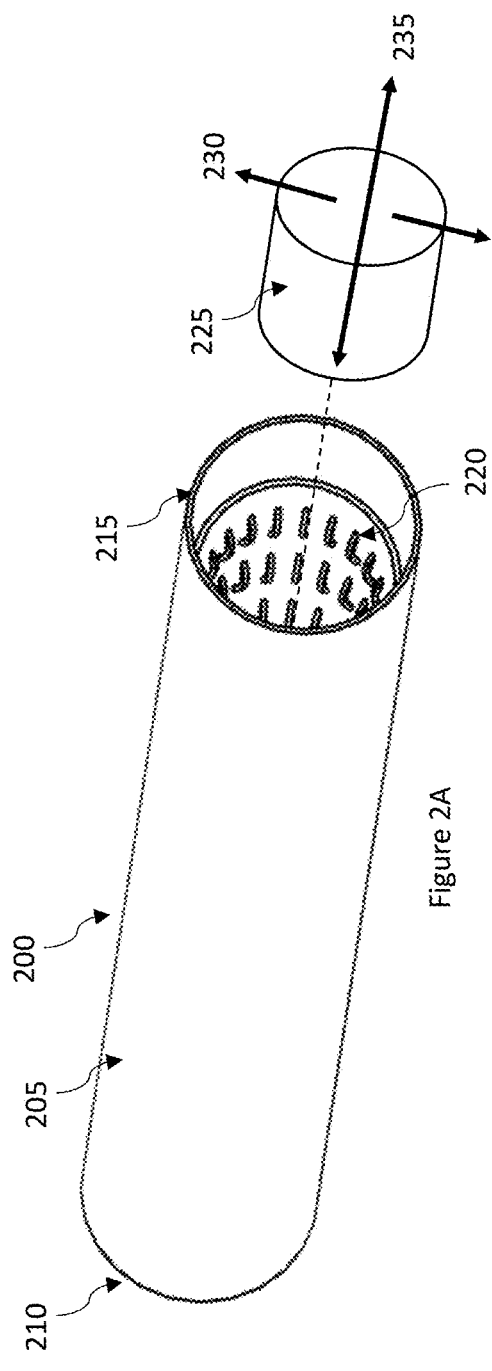
FIGS. 2A-2B illustrate isometric views of another example embodiment of a sensor including a sensor suspension according to some implementations of the current subject matter.

It is noted that the drawings are not necessarily to scale. The drawings are intended to depict only typical aspects of the subject matter disclosed herein, and therefore should not be considered as limiting the scope of the disclosure.

DETAILED DESCRIPTION

Sensors can include sensor elements arranged within a housing or a body. Often sensors are manufactured from individual components and are assembled after manufacture of the individual components. For example, a sensor can include a housing, wiring, a sensor element, and components to secure the sensor element within the housing. This type of serial manufacturing and assembly of sensor components can introduce likelihood of quality control issues, manufacturing defects, and improper assembly, which can render the sensor inoperable and can increase manufacturing and repair costs. It can be physically difficult to assembly complex sensors with numerous internal components and can require specialized equipment, jigs, or other manufacturing tools/processes to create and assemble sensor components in this manner. In addition, sourcing different materials for the various sensor components can be time consuming, delay manufacturing/assembly operations, and increase overall cost of the sensor. Using different materials can also make it difficult to maintain the manufacturers intended design specifications of the sensor. For example, using separately sourced materials or components for a sensor housing and suspension elements within the sensor housing may not achieve a desired ratio between a dimeter of the sensor element and a diameter of the housing necessary to maintain performance of the sensor during conditions of shock or vibration.

Current manufacturing techniques include machining various components, such as the sensor housing, suspension components, and any caps or fitting necessary to seal the sensor. Assembly can require specific sequences of placing specific components within the housing prior to placing other components in the housing. Any tuning of the sensor can require additional time and materials to disassemble the sensor, source different repair materials from various manufacturing sources, reassemble the sensor with the repair materials, and testing the repaired sensor.

The current subject matter can include an improved sensor and method of manufacturing the sensor. The sensor can be formed using additive manufacturing techniques to manufacture the sensor as an integrated, single unit consisting of a housing, suspension elements formed integrally within the housing. In some embodiments, the sensor formed via additive manufacturing techniques can also include an end cap that is also formed by the additive manufacturing techniques. The end cap can be formed integrally within the housing such that the end cap is included in the integrated single unit. The end cap can include suspension elements that are formed integrally within portions of the end cap.

Some implementations of the current subject matter described herein include a sensor with an integrated suspension formed within a housing and/or an integrated suspension formed within a compression plate or end cap of the sensor. The sensor can be manufactured using a metal material deposited and formed using additive manufacturing technology. The sensor can include radial spring suspension elements including arched beams. The arched beams can be secured at one or both ends to the sensor housing. The arched beams can act as radial springs to suspend a crystal mass or sensor element within the housing and can provide radial stiffness to prevent the crystal mass or sensor element from resonating, cracking, or colliding with inner surfaces of the housing under vibration or shock conditions. The stiffness of the suspension elements can be modified by changing the cross sectional geometry, bending geometry, length, and number of secured ends of the arched beams forming the radial suspension elements. Stiffness can also be modified by changing the total number of radial suspension elements in the sensor.

The sensor can also include axial spring suspension elements. The axial spring suspension elements can include arched beams secured at one or both ends to either an end cap or compression plate. The axial suspension elements can act as axial springs to suspend the crystal mass or sensor element and can provide axial stiffness to prevent the crystal mass or sensor element from resonating, cracking, or colliding with the end cap under vibration or shock conditions. The stiffness of the axial suspension elements can be modified by changing the cross sectional geometry, bending geometry, length, and number of secured ends of the beams. Stiffness can also be modified by changing the total number of axial suspension elements in the sensor.

The use of additive manufacturing techniques to form a sensor with integral suspension elements therein can advantageously address the problems associated with sourcing, assembling, deploying, and repairing sensors manufactured using non-additive manufacturing techniques, such as machining and assembling individual components. For example, component material selection and availability are no longer dependent on vendor supply or lead times. Any tuning or design changes required to adjust a functional aspect of the sensor can be performed by adjusting a material composition, geometry, or additive manufacturing deposition techniques rather than sourcing and awaiting delivery of suitable repair parts prior to assembly and testing of the new components.

FIGS. 1A-1B illustrate isometric views of an example embodiment of a sensor including a sensor suspension according to some implementations of the current subject matter. As shown in FIG. 1A, a sensor 100 can include a housing 105. The housing 105 can be a cylindrical housing. In some embodiments, the housing can be non-cylindrical, such a polygonal housing. The housing can include a metal material, a non-metal material, or a mixture of metal and non-metal materials. In some embodiments the metal material can include titanium, aluminum, stainless steel or a combination thereof. In some embodiments, the metal material can include alloy 718. The housing 105 can include an outer surface, an inner surface and a cavity therein. The housing 105 can also include a first end 110 and a second end 115. The first end 110 can include an end cap that can be integrally formed within the housing 105. The second end 115 can include an opening. The inner surface of the housing 105 can include a plurality of suspension elements 120. The suspension elements 120 can be formed in a variety of patterns on the inner surface of the housing. For example, the plurality of suspension elements 120 can be arranged in uniformly arranged rows and columns, non-uniformly arranged rows and columns, or in multiple portions which can include different arrangements of suspension elements relative to other portions arranged within the housing 105. In some embodiments, the each suspension element of the plurality of suspension elements 120 can be arranged orthogonal to a length of the housing 105, for example as shown in the embodiment of FIG. 1A. In some embodiments, each suspension element can be arranged parallel with the length of the housing 105.

Each suspension element of the plurality of suspension elements 120 can be configured to couple to the inner surface of the housing at one end of the suspension element or both ends of the suspension element. The plurality of suspension elements 120 can provide a spring force to limit radial movement of a sensor element within the housing 105. For example, as shown in FIG. 1A, the sensor 100 can include a sensor element 125, such a crystal mass. The sensor element 125 can translate within the housing 105 in a radial direction 130 and/or an axial direction 135 during operation of the sensor 100. The plurality of suspension elements 120 can be configured to reduce or limit amounts of translation of the sensor element 125 in the radial direction 130 within the housing 105.

As shown in FIG. 1B, the sensor 100 also includes an end cap 140. In some embodiments, the end cap 140 can be integrally formed within the housing 105. In some embodiments, the end cap 140 can be formed separately from the housing 105 and can be inserted into the first end 110 of the housing 105 as a separate component. In such embodiments, the end cap 140 can be formed separately using the same additive manufacturing techniques and materials as used to form the housing 105. In some embodiments, the end cap 140 can be welded or soldered to the housing 105.

Figure 2B:
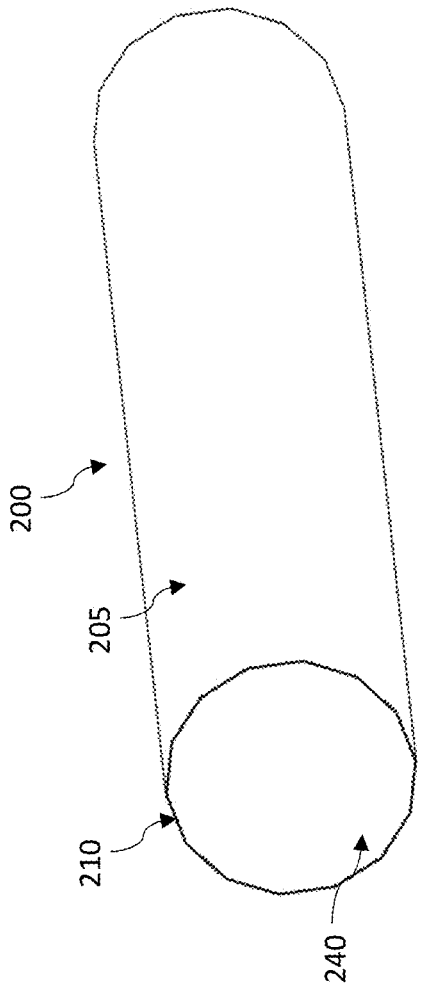

FIGS. 2A-2B illustrate isometric views of another example embodiment of a sensor including a sensor suspension according to some implementations of the current subject matter. As shown in FIG. 2A, the sensor 200 can include a housing 205, a first end 210, a second end 215, and a plurality of suspension elements 220. The plurality of suspension elements 220 can be arranged in parallel with a length of the housing 205, as shown in FIG. 2B. The sensor 200 can include a sensor element 225 configured to be inserted into and received within the housing 205. The sensor element 225 can translate in a radial direction 230 and/or an axial direction 235 within the housing 205. The plurality of suspension elements 220 can be configured to reduce or limit the amount of radial translation 230 of the sensor element 225 within the housing 205. As shown in FIG. 2B, the sensor 200 can include an end cap 240 integrally formed within or inserted into the first end 210 of the housing 205.

Figure 3:
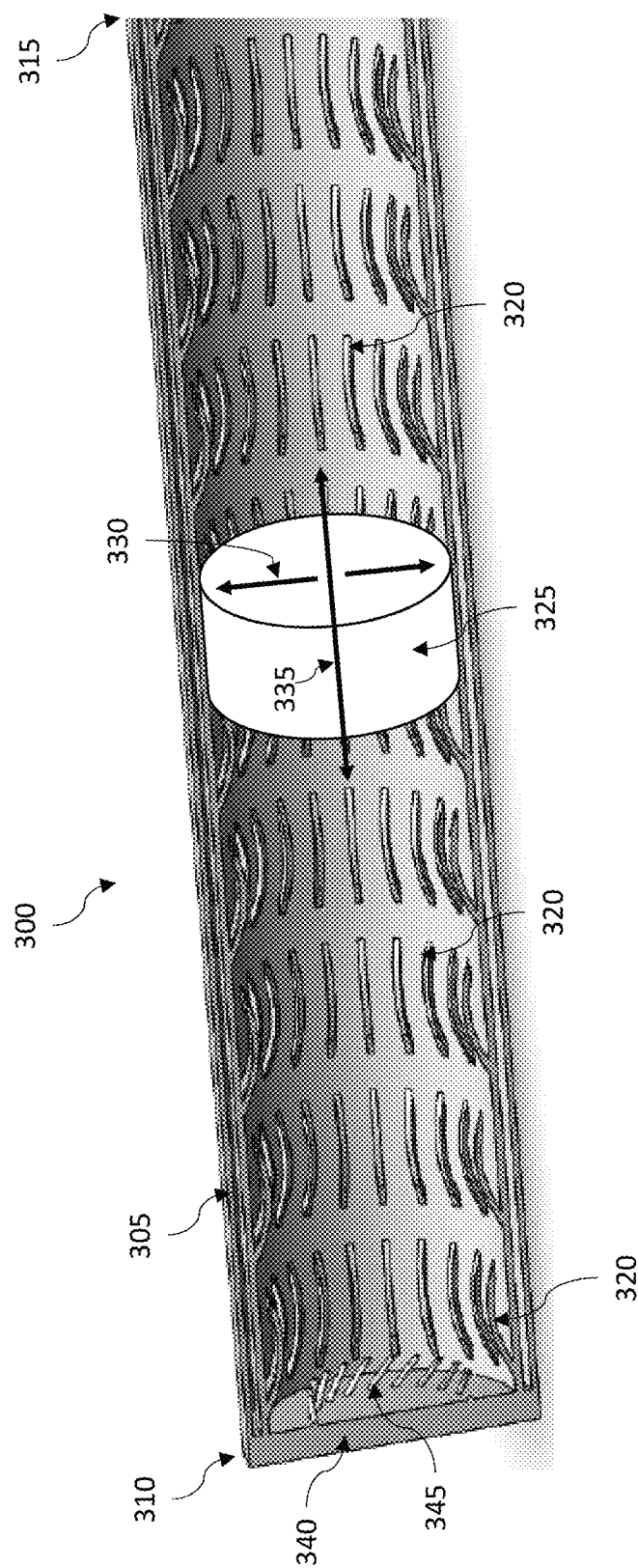
FIG. 3 illustrates an isometric cross-sectional view of the sensor of FIG. 2 according to some implementations of the current subject matter.

FIG. 3 illustrates an isometric cross-sectional view of the sensor of FIG. 2 according to some implementations of the current subject matter. As shown in FIG. 3, the sensor 300 can include a housing 305, a first end 310 and a second end 315. The sensor 300 can include a plurality of suspension elements 320 projecting from an inner surface of the housing 305. The plurality of suspension elements 320 can be configured to reduce or limit an amount of radial translation 330 of a sensor element 325 within the housing 305. The plurality of suspension elements 320 can include arched beam structures that can be affixed to the inner surface of the housing 305 at one or both ends of an individual suspension element. The plurality of suspension elements 320 can be configured to provide a spring force against the sensor element 325 (and to therefore reduce radial translation 330 of the sensor element 325 within the housing 305). In some embodiments, the sensor element can be a crystal and can be formed from cerium bromide, lanthanum halide, or sodium iodide.

As further shown in FIG. 3, the sensor 300 can include an end cap 340 that can be integrally formed within the housing 305 at the first end 310 of the sensor 300. The end cap 340 can include an additional plurality of suspension elements 345. The plurality of suspension elements 345 can include axial suspension elements configured to reduce or limit an amount of axial translation 335 of the sensor element 325 within the housing 305. In some embodiment, each axial suspension element can be coupled to the end cap 340 at one end of the axial suspension element 345, for example, as shown in FIG. 3. In some embodiments, both ends of the axial suspension element 345 can be coupled to the end cap 340.

FIGS. 4A-4B illustrate isometric views of another example embodiment of a sensor including a sensor suspension according to some implementations of the current subject matter. As shown in FIG. 4A, the sensor 400 can include a housing 405, a first end 410, and a second end 415. The sensor 400 can also include an inner surface 420 configured to suspend the sensor element 425 with the housing 405. For example, as shown in FIG. 4A, the inner surfaces 420 can be polygonal shaped surfaces and can be arranged and dimensioned so as to exert a spring force against the sensor element 425 to reduce an amount of radial translation 430 of the sensor element 425 within the housing 405. As shown in FIG. 4B, the sensor 400 can include an endcap 440 integrally formed within the first end 410 of the sensor 400.

Figure 5:
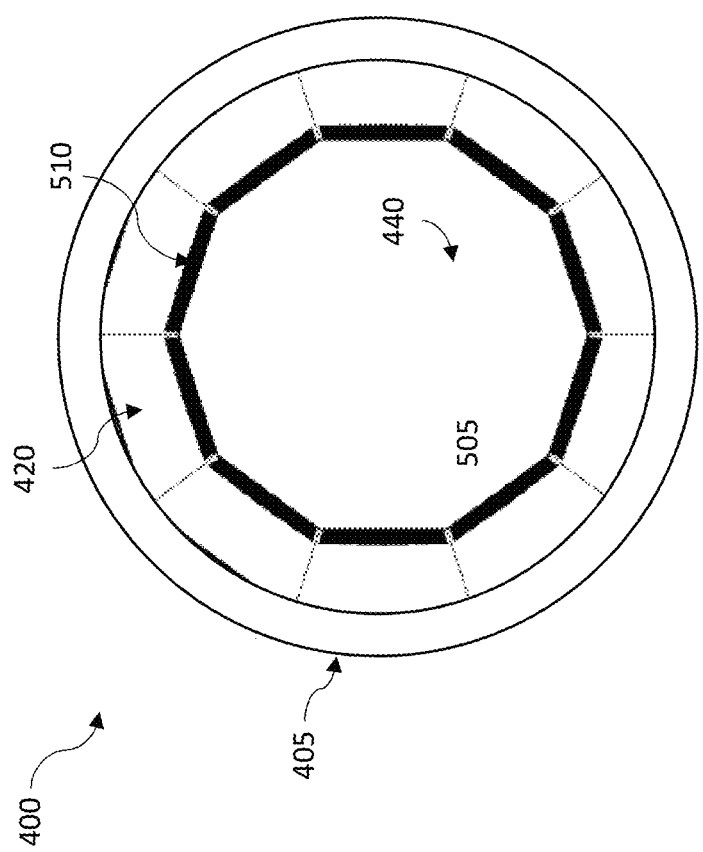
FIG. 5 illustrates a cross-sectional view of the sensor of FIGS. 4A-4B according to some implementations of the current subject matter.

FIG. 5 illustrates a cross-sectional view of the sensor of FIGS. 4A-4B according to some implementations of the current subject matter. As shown in FIG. 5, the sensor 400 can include a housing 405, an inner surface 420 of the housing 405, and a surface 505 of the end cap 440. The surface 505 can include a plurality of suspension elements 510 arranged to project into the cavity of the housing away from the surface 505 of the end cap 440. The plurality of suspension elements can be configured to provide a spring force to reduce or limit an amount of axial translation of the sensor element 425 within the housing 405.

FIGS. 6A-6B illustrate cross-sectional views of an example embodiment of a plurality of suspension elements included in the sensor described herein according to some implementations of the current subject matter. As shown in FIG. 6A, the housing 605 of the sensor described herein can include an inner surface 610. The inner surface 610 can include a plurality of suspension elements 615. The suspension elements 615 can form a tilted beam suspension element that extends at a first angle away from the inner surface 610 towards the cavity 620 of the housing 605 and then extends at a second angle away from the first angle so as to be approximately parallel with the inner surface 610. The tilted beam suspension element 615 of FIG. 6A is illustrated in FIG. 6B for clarity.

FIGS. 6C-6D illustrate cross-sectional views of another example embodiment of a plurality of suspension elements included in a housing of the sensor described herein according to some implementations of the current subject matter. As shown in FIG. 6B, an inner surface 610 of the housing of the sensor described herein can include a plurality of suspension elements 625. The suspension elements 615 can form a cantilever beam suspension element that extends at a first angle away from the inner surface 610 towards the cavity 620 of the housing 605. The cantilever beam suspension element of FIG. 6C is illustrated in FIG. 6D for clarity.

Figure 7A:
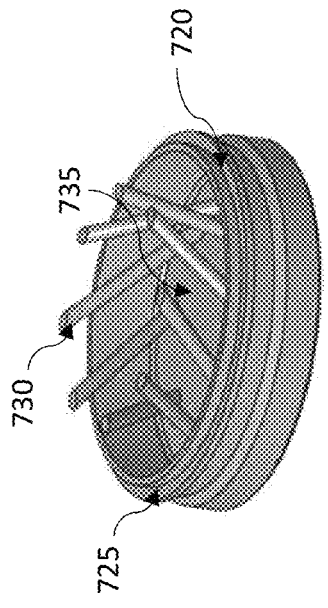
FIGS. 7A-7C illustrate isometric views of example embodiments of a plurality of suspension elements included in an end cap of the sensor described herein according to some implementations of the current subject matter.
Figure 7B:
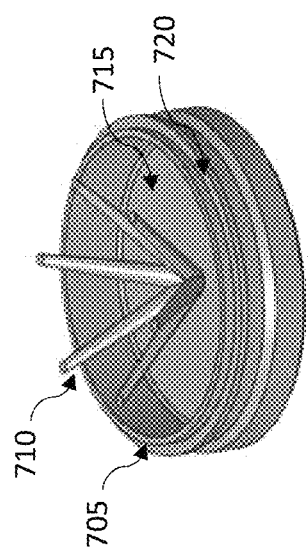
Figure 7C:
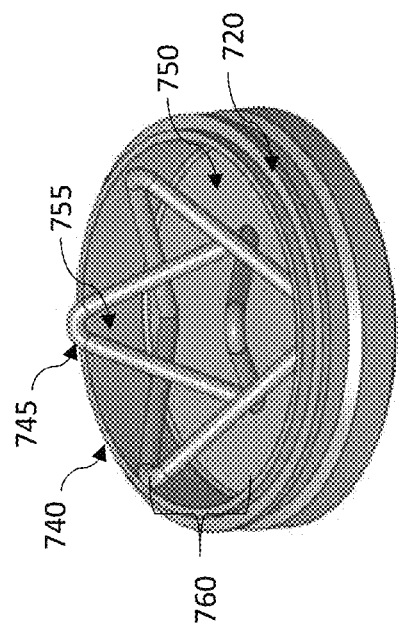

FIGS. 7A-7C illustrate isometric views of example embodiments of a plurality of suspension elements included in an end cap of the sensor described herein according to some implementations of the current subject matter. As shown in FIG. 7A, in one embodiment, the end cap 705 can include a plurality of suspension elements 710 extending from a top surface 715 of the end cap 705 toward the cavity of the housing of the sensor described herein. The plurality of suspension elements 710 can be configured as axial suspension elements and can be arranged to reduce or limit an amount of axial travel of a sensor element within the housing of the sensor described herein. As shown in FIG. 7A, each suspension element of the plurality of suspension elements 710 can include a diameter that varies along the length of each suspension element 710 such that a progressive spring force can be generated. Although the plurality of suspension elements 710 is shown with a circular-shaped cross-section, additional shaped cross-sections can be implemented. For example, in some embodiments, the shape of the cross-section of the plurality of suspension elements 710 can include geometric-shaped cross-sections. As further shown in FIG. 7A, the end cap 705 can include a collar or integrated gasket 720 configured to secure the end cap 705 within the housing of the sensor described herein when the end cap 705 can be formed separately from the housing using additive manufacturing techniques.

As shown in FIG. 7B, in another embodiment, the end cap 725 can include a circular arrangement of angled suspension elements 730 extending from the top surface 735 of the end cap 725 toward the cavity of the housing of the sensor described herein. The plurality of suspension elements 730 can be configured as axial suspension elements and can be arranged to reduce or limit an amount of axial travel of a sensor element within the housing of the sensor described herein. As shown in FIG. 7B, each suspension element of the plurality of suspension elements 730 can include a uniform diameter that does not vary along the length of each suspension element 730. In some embodiments, the diameter of each suspension element of the plurality of suspension elements 730 can vary along its length such that a progressive spring force can be generated. In some embodiments, the angle at which each suspension element 730 extends away from the top surface 735 of the end cap 725 can be configured such that a progressive spring force can be generated. Although the plurality of suspension elements 730 are shown with a circular-shaped cross-section, additional shaped cross-sections can be implemented. For example, in some embodiments, the shape of the cross-section of the plurality of suspension elements 730 can include geometric-shaped cross-sections. As further shown in FIG. 7B, the end cap 725 can include a collar or integrated gasket 720 configured to secure the end cap 725 within the housing of the sensor described herein when the end cap 725 can be formed separately from the housing using additive manufacturing techniques.

As shown in FIG. 7C, in another embodiment, the end cap 740 can include an arrangement of a plurality of V-shaped suspension elements 745 extending from the top surface 750 of the end cap 740 toward the cavity of the housing of the sensor described herein. The plurality of suspension elements 745 can be configured as axial suspension elements and can be arranged to reduce or limit an amount of axial travel of a sensor element within the housing of the sensor described herein. As shown in FIG. 7C, each suspension element of the plurality of suspension elements 745 can opening angle 755. The opening angle 755 can be configured in varying angles to create varying amounts of spring force and stiffness. In some embodiments, the suspension elements 745 can include an engagement height 760 that can be configured to vary the stiffness as a step-function in response to a given amount of displacement force exerted on the plurality of suspension elements 745 by the sensor element as it translates axially within the housing of the sensor described herein and into contact with the plurality of suspension elements 745. In some embodiments, the diameter of each suspension element of the plurality of suspension elements 745 can vary along its length such that a progressive spring force can be generated. In some embodiments, the angle at which each suspension element 745 extends away from the top surface 750 of the end cap 740 can be configured such that a progressive spring force can be generated. As further shown in FIG. 7C, the end cap 740 can include a collar or integrated gasket 720 configured to secure the end cap 740 within the housing of the sensor described herein when the end cap 725 can be formed separately from the housing using additive manufacturing techniques.

Figure 8:
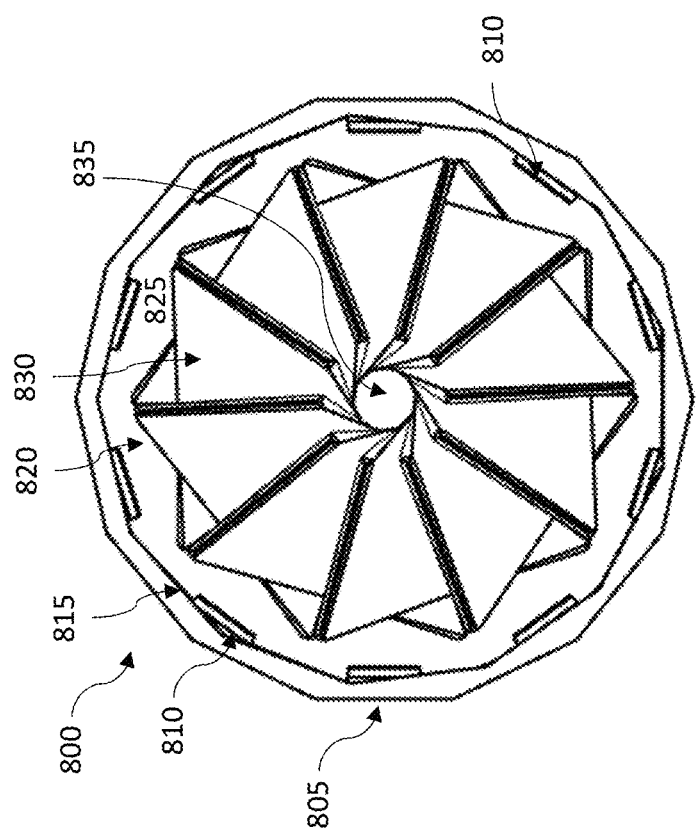
FIG. 8 illustrates a cross-sectional view of a sensor as described herein including another example embodiment of a plurality of suspension elements included in the end cap of the sensor according to some implementations of the current subject matter.

FIG. 8 illustrates a cross-sectional view of a sensor as described herein including another example embodiment of a plurality of suspension elements included in the end cap of the sensor according to some implementations of the current subject matter. As shown in FIG. 8, the sensor 800 can include a polygonal-shaped housing 805 and a plurality of suspension elements 810 formed on an inner surface 815 of the housing 805. The plurality of suspension elements 810 can include radial suspension elements 810 configured to reduce or limit an amount of radial displacement of the sensor element within the housing 805.

As further shown in FIG. 8, the sensor 800 includes an end cap 820 (of which a top surface 825 is shown). The end cap 820 can include a plurality of suspension elements 830 extending from the top surface 825 toward the cavity of the sensor 800. The plurality of suspension elements 830 can be arranged in a spiral pattern extending from a center 835 outward in a radial direction. In some embodiments, the plurality of suspension elements 830 can include square, triangular, circular, elliptical, or polygonal shaped suspension elements or a combination thereof. In some embodiments, portions of each suspension element 830 can overlap with a portion of an adjacent suspension element 830. The plurality of suspension elements 830 can include axial suspension elements 830 configured to reduce or limit an amount of axial displacement of the sensor element within the housing 805. In some embodiments, the plurality of suspension elements 830 can be configured to provide a progressive spring force in response to axial displacement of the sensor element against the end cap 820 and the plurality of suspension elements 830 configured thereon.

Figure 9A:
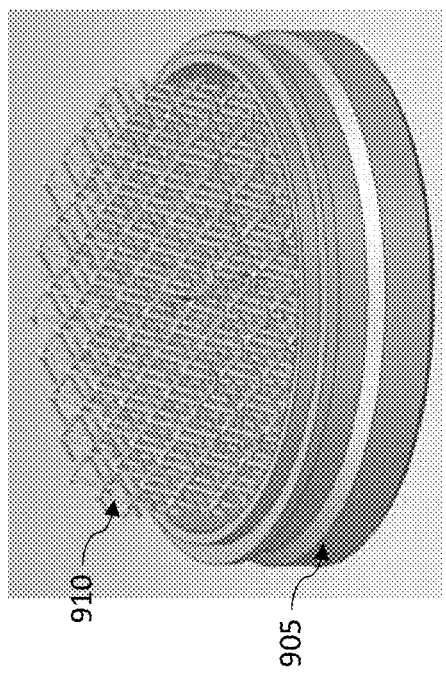
FIG. 9A illustrates an isometric view of another example embodiment of a plurality of suspension elements included in the end cap of the sensor described herein according to some implementations of the current subject matter.

FIG. 9A illustrates an isometric view of another example embodiment of a plurality of suspension elements included in the end cap of the sensor described herein according to some implementations of the current subject matter. As shown in FIG. 9A, the end cap 905 can include a plurality of suspension elements 910 in a lattice or matrix formation. The plurality of suspension elements can include axial suspension elements 910 configured to reduce or limit an amount of axial displacement of the sensor element within the housing 805. In some embodiments, the lattice can be a flexible lattice and can be configured to provide a progressive spring response or a linear spring response when a given load is applied to the lattice structure. A variety of lattice shapes and dimensions can be envisioned.

Figure 9B:
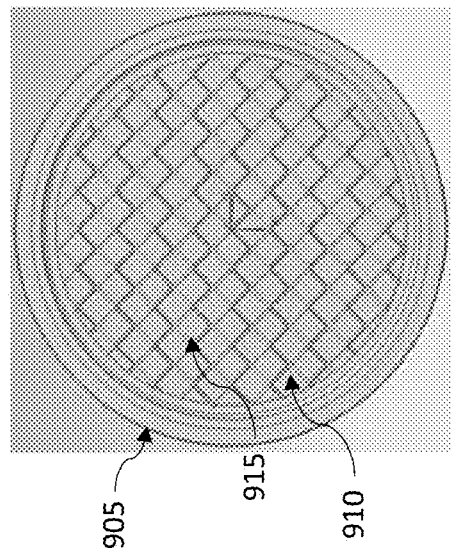
FIG. 9B illustrates a cross-sectional view of the embodiment of FIG. 9A according to some implementations of the current subject matter.

FIG. 9B illustrates a cross-sectional view of the embodiment of FIG. 9A according to some implementations of the current subject matter. As shown in FIG. 9B, the plurality of suspension elements 910 can form a lattice structure. Although the lattice structure is shown with individual cells 915 which are square shaped, additional cell shapes can be included to form the lattice structure which forms the plurality of suspension elements 910.

Figure 10:
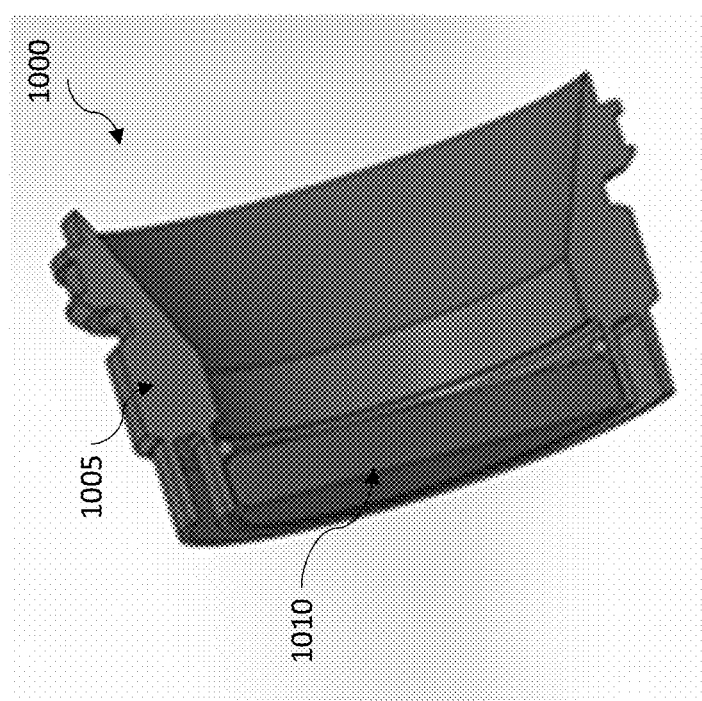
FIG. 10 illustrates an isometric view of an example embodiment of a second end cap of the sensor described herein according to some implementations of the current subject matter.

FIG. 10 illustrates an isometric view of an example embodiment of a second end cap of the sensor described herein according to some implementations of the current subject matter. As shown in FIG. 10, the second end cap 1000 can include a housing 1005 and a window 1010 arranged within the housing 1005. In some embodiments, the end cap 1000 can be a second end cap that can be inserted into the second end of a sensor as described herein. For example, the second end cap 1000 can be inserted into the second end 115 of sensor 100 described in relation to FIG. 1. In some embodiments, the second end cap 1000 can be formed via the same additive manufacturing techniques and using the same materials as were used to form the housing and the end cap of the sensor described herein, for example the housing 105 and the end cap 110 described in relation to FIG. 1. In some embodiments, the second end cap 1000 can be welded to the housing after the sensor element has been inserted into the housing. In some embodiments, the window 1010 can include a sapphire window.

Figure 11:
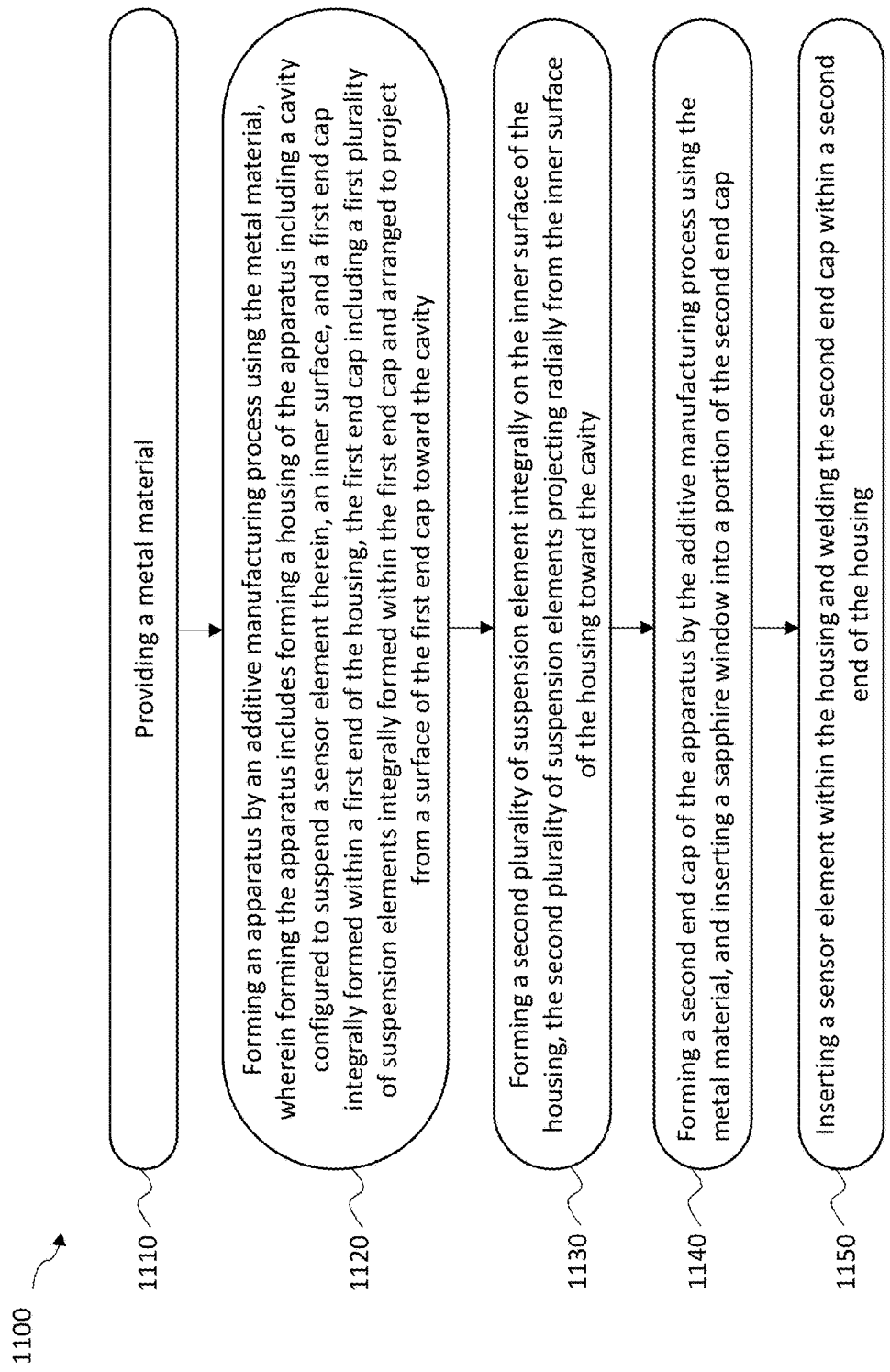
FIG. 11 illustrates a process flow diagram of an example embodiment of a method for manufacturing the sensor of FIGS. 1-10 according to some implementations of the current subject matter.

FIG. 11 illustrates a process flow diagram of an example embodiment of a method for manufacturing the sensor of FIGS. 1-10 according to some implementations of the current subject matter. As shown in FIG. 11, the method 1100 starts at 1110, at which a metal material is provided. The metal material can include titanium, aluminum, stainless steel or a combination thereof. In some embodiments, additional materials can be mixed with the metal material to form an alloy or a composition including a non-metallic material.

At 1120, the method 1100 can include forming an apparatus by an additive manufacturing technique using the metal material provided at 1110. In some embodiments, the additive manufacturing technique can include material jetting, binder jetting, material extrusion, powder bed fusion (e.g., such as direct metal laser melting (DMLM), electron beam melting, and selective laser melting (SLS)), sheet lamination, and directed energy deposition.

The axial and radial suspension elements described herein can be formed with respect to a variety of parameters such as stiffness, vibrational frequency, shock resistance, dampening, active load caused by sensor element displacement, or the like. The plurality of axial and radial suspension elements described herein can be configured to secure the sensor element within the housing during conditions in which the sensor element may undergo thermal expansion, as well as conditions in which the sensor element can be axially or radially displaced due to vibration or shock conditions, such as may occur when the sensor and sensor elements are shaken. The plurality of suspension elements can act as a spring to absorb the displacement of the sensor element and to maintain the sensor element in position within the housing of the sensor.

In some embodiments, the metal material or the additive manufacturing process are selected to form the first plurality of suspension elements, such as the plurality of suspension elements 345 in FIG. 3, with a predetermined amount of axial stiffness, a predetermined amount of axial vibration dampening, or a predetermined amount of temperature induced axial displacement with respect to the axial translation 335 of the sensor element 325 within the housing 305.

In some embodiments, the metal material or the additive manufacturing process can be selected to form the second plurality of suspension elements, such as the plurality of suspension elements 320 in FIG. 3, with a predetermined amount of radial stiffness, a predetermined amount of radial vibration dampening, or a predetermined amount of temperature induced radial displacement with respect to the radial translation 330 of the sensor element 325 within the housing 305.

Forming the apparatus can include forming a sensor, such as the sensor 100 shown and described in relation to FIG. 1. In some embodiments, the sensor can be a gamma sensor. Forming the apparatus can include forming a housing 105 of the sensor 100 including a cavity configured to suspend a sensor element 125 therein, an inner surface, and a first end cap 140 integrally formed within a first end 110 of the housing 105. As shown in FIG. 3, the first end cap 340 can include a first plurality of suspension elements 345 integrally formed within the first end cap 340 and arranged to project from a surface of the first end cap 340 toward the cavity of the housing 305.

At 1130, the method 1100 can also include forming a second plurality of suspension elements 320 integrally on the inner surface of the housing 305, the second plurality of suspension elements 320 projecting radially from the inner surface of the housing 305 toward the cavity.

At 1140, the method 1100 can further include forming a second end cap of the apparatus by the additive manufacturing process using the metal material, and inserting a sapphire window into a portion of the second end cap. For example, as described in relation to FIG. 10, the second end cap 1000 can be formed using the metal material. A sapphire window 1010 can be inserted into a housing 1005 of the second end cap 1000.

At 1150, a sensor element can be inserted within the housing. The second end cap can be welded within a second end of the housing. For example, as described in relation to FIGS. 1 and 10, a sensor element 125 can be inserted into the housing 105. In some embodiments, the sensor element can be a crystal and can be formed from cerium bromide, lanthanum halide, or sodium iodide. The second end cap 1000 can be welded within a second end 115 of the housing 105.

Figure 12:
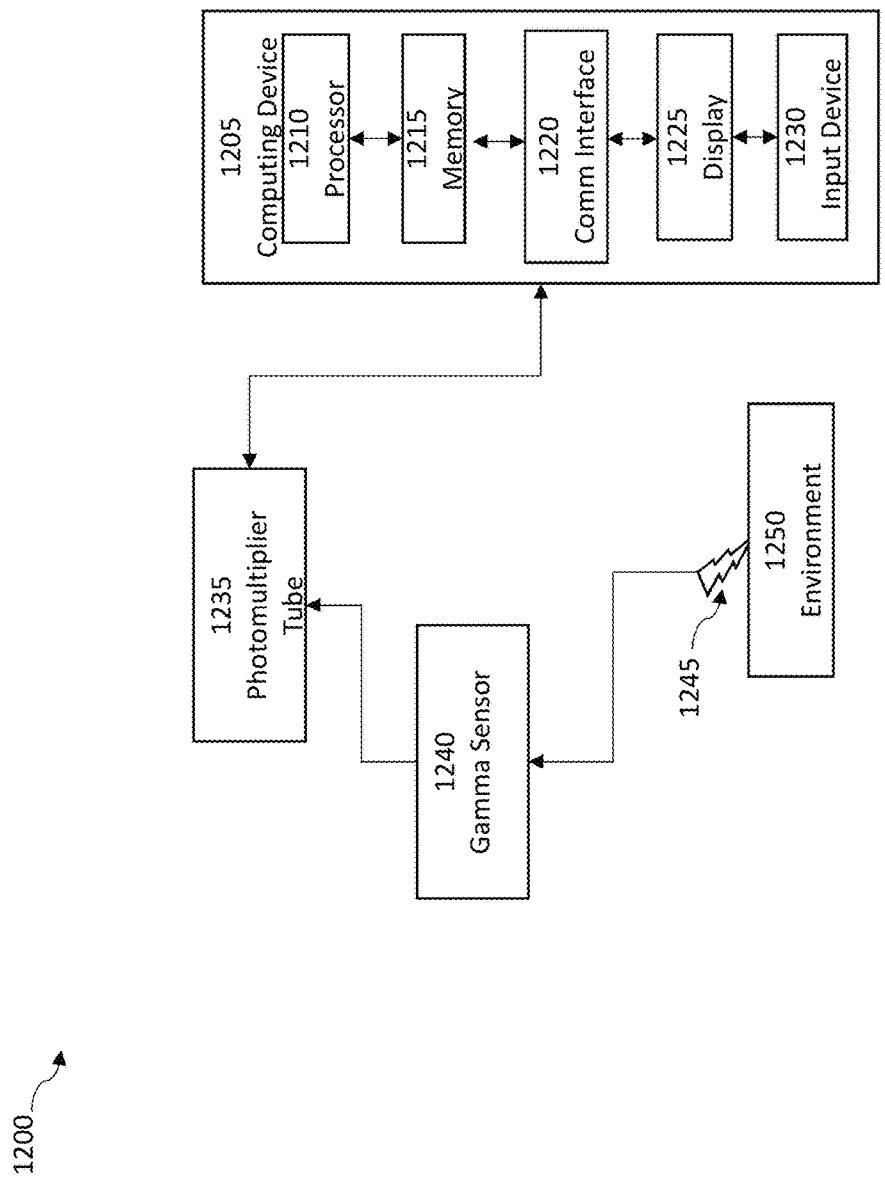
FIG. 12 illustrates a block diagram of an example embodiment of a system including the sensor of FIG. 1 according to some implementations of the current subject matter.

FIG. 12 illustrates a block diagram of an example embodiment of a system including the sensor of FIG. 1 according to some implementations of the current subject matter. As shown in FIG. 12, the system 1200 can include a computer device 1205 configured to receive and process sensor data generated by the sensor formed according the method 1100 of FIG. 11. The computing device 1205 can include a processor 1201, a memory 1215, a communication interface 1220, a display 1225, and one or more input devices 1230. The processor 1210 of the computing device 1205 can be configured to execute computer-readable instructions stored in the memory to process the data received via the communication interface 1220. The memory 1215 can also store sensor data generated by the sensor described herein. The display 1225 can include a monitor, scope, or similar display device configured to present the sensor data received by the computing device 1205. The input devices 1230 can include a keyboard, mouse, joystick, a knob, a dial, a touchscreen, or the like with which a user can interact with the sensor data and/or the computing device 1205.

As further shown in FIG. 12, the system 1200 can include a photomultiplier tube 1235 coupled to the computing device 1205. The photomultiplier tube 1235 can receive photons from the sensor 1240 and can convert the photons into an electrical signal which can be provided to the computing device 1205 for analysis, processing, storage, and reporting. The sensor 1240 can be a gamma sensor described herein and formed according to the method 1100 of FIG. 11. The gamma sensor 1240 can receive gamma energy 1245 from the environment 1250 in which the gamma sensor 1240 can be configured to sense.

Exemplary technical effects of the apparatus, methods, systems, described herein include, by way of non-limiting example, forming a sensor including a sensor element suspension via additive manufacturing techniques. This method of forming a sensor and sensor suspension can reduce the need for separately manufactured and assembled sensor components and can provide a sensor housing with a plurality of suspension elements integrally formed therein. The suspension elements can be formed to reduce amounts of radial and axial translation of a sensor element disposed within the sensor housing and interfacing with the suspension elements. The suspension elements can be configured with a variety of stiffness, vibration dampening, and thermal displacement by way of forming the suspension elements using the additive manufacturing techniques described herein. Forming a unitary housing with integrated suspension elements in this manner can reduce inventory lead times, decrease the number of individual sensor components requiring assembly, reduce repair and replacement costs, and provide a more reliable and precise sensor.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in or coupled to a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. An apparatus comprising:
a one-piece housing formed solely from a single metal or a single alloy chosen from titanium, aluminum and stainless steel and configured to house a sensor element therein, the one-piece housing comprising
a cavity defined by a continuous inner surface,
a first end cap formed within a first end of the housing, the first end cap including a concave surface,
a first plurality of V-shaped suspension elements formed within the concave surface of the first end cap, each suspension element of the first plurality of V-shaped suspension elements arranged to project at a first end from the concave surface of the first end cap toward the cavity, wherein a second end of each of the first plurality of V-shaped suspension elements is configured to directly contact and provide axial suspension to the sensor element as the sensor element translates within the cavity; and
a second plurality of suspension elements formed along and extending from the continuous inner surface of the housing.

2. The apparatus of claim 1, wherein each of the first plurality of V-shaped suspension elements includes a diameter that varies along a length of each suspension element to generate a progressive spring force on the sensor element; and a second end cap affixed to a second end of the housing.

3. The apparatus of claim 1, wherein at least one suspension element of the second plurality of suspension elements includes a radial suspension element coupled to the inner surface of the housing at a first end of the radial suspension element and/or at a second end of the radial suspension element.

4. The apparatus of claim 1, wherein the sensor element is formed from cerium bromide, lanthanum halide, or sodium iodide.

5. The apparatus of claim 4, wherein the apparatus is a gamma sensor.

6. The apparatus of claim 1, wherein the second end cap comprises a sapphire window.

7. A method comprising:
forming a one-piece housing configured to house a sensor element therein by an additive manufacturing process using solely a single metal or a single alloy chosen from titanium, aluminum and stainless steel, wherein forming the one-piece housing comprises
forming a cavity configured to suspend a sensor element therein, wherein the cavity is defined by a continuous inner surface,
forming a first end cap within a first end of the housing, the first end cap including a concave surface,
forming a first plurality of V-shaped suspension elements within the concave surface of the first end cap, each suspension element of the first plurality of V-shaped suspension elements arranged to project at a first end from the concave surface of the first end cap at a first end toward the cavity, wherein a second end of each of the first plurality of V-shaped suspension elements is configured to directly contact and provide axial suspension to the sensor element as the sensor element translates within the cavity, and forming a second plurality of suspension elements extending from the continuous inner surface of the housing; and affixing a second end cap to a second end of the housing.

8. The method of claim 7, wherein each of the first plurality of V-shaped suspension elements includes a diameter that varies along a length of each suspension element to generate a progressive spring force on the sensor element.

9. The method of claim 7, wherein the metal material or the additive manufacturing process are selected to form the second plurality of suspension elements with a predetermined amount of radial stiffness, a predetermined amount of radial vibration dampening, or a predetermined amount of temperature induced radial displacement.

10. The method of claim 7, wherein the metal material or the additive manufacturing process are selected to form the first plurality of V-shaped suspension elements with a predetermined amount of axial stiffness, a predetermined amount of axial vibration dampening, or a predetermined amount of temperature induced axial displacement.

11. The method of claim 7, further comprising:

forming the second end cap of the apparatus, prior to the step of affixing, by the additive manufacturing process using the metal material, inserting a sapphire window into a portion of the second end cap; and inserting the sensor element within the housing and welding the second end cap within the second end of the housing.

12. A system comprising:

a one-piece sensor housing formed solely from a single metal or a single alloy chosen from titanium, aluminum stainless steel configured to receive a sensor element therein, the one- piece sensor housing comprising a cavity defined by a continuous inner surface, a first end cap formed within a first end of the housing, the first end cap including a concave surface, a first plurality of V-shaped suspension elements formed within the concave surface of the first end cap, each suspension element of the first plurality of V-shaped suspension elements arranged to project at a first end from the concave surface of the first end cap toward the cavity, wherein a second end of each of the first plurality of V-shaped suspension elements is configured to directly contact and provide axial suspension to the sensor element as the sensor element translates within the cavity, and a second plurality of suspension elements formed on and extending from the continuous inner surface of the housing;

a second end cap affixed to a second end of the housing;

the sensor element disposed within the housing;

a photomultiplier tube coupled to the one-piece sensor housing; and a computing device communicatively coupled to the photomultiplier tube, the computing device including at least one data processor configured to receive data generated by the photomultiplier tube.

13. The system of claim 12, wherein the sensor element is formed from cerium bromide, lanthanum halide, or sodium iodide and the sensor is a gamma sensor.

* * * * *